United States Patent [19]
Nishishita

[11] Patent Number: 5,551,506
[45] Date of Patent: Sep. 3, 1996

[54] LAMINATED HEAT EXCHANGER

[75] Inventor: Kunihiko Nishishita, Konan, Japan

[73] Assignee: Zexel Corporation, Tokyo, Japan

[21] Appl. No.: 361,555

[22] Filed: Dec. 22, 1994

[30] Foreign Application Priority Data

Dec. 24, 1993 [JP] Japan .................................. 5-347796

[51] Int. Cl.⁶ .................................. F28D 1/03; F28F 7/00
[52] U.S. Cl. .............................. 165/76; 165/81; 165/153; 165/DIG. 51; 228/183
[58] Field of Search ....................... 165/76, 81; 228/153, 228/183

[56] References Cited

U.S. PATENT DOCUMENTS

| | | |
|---|---|---|
| 3,104,701 | 9/1963 | Jacoby, Jr. . |
| 4,274,482 | 6/1981 | Sonoda . |
| 4,809,518 | 3/1989 | Murayama . |
| 5,024,269 | 6/1991 | Noguchi et al. . |
| 5,042,577 | 8/1991 | Suzumura . |
| 5,370,176 | 12/1994 | Nishishita et al. .................. 165/81 |

FOREIGN PATENT DOCUMENTS 4009780  10/1991  Germany .
9303869  7/1993  Germany .

Primary Examiner—Allen J. Flanigan
Attorney, Agent, or Firm—Wenderoth, Lind & Ponack

[57] ABSTRACT

A heat exchanger having tube elements, each of which is provided with a pair of tanks on one side and a U-shaped passage that communicates between the pair of tanks, laminated alternately with fins over a plurality of levels. Two tank groups that extend along the direction of lamination are formed. Intake/outlet portions, through which heat exchanging medium flows, are provided on one end along the direction of lamination. One of the intake/outlet portions communicates with one of the tank groups via a communicating pipe. One end of the communicating pipe is inserted into a fitting hole formed in an end plate or in a cylindrical portion extending from the periphery of the insertion hole in anticipation of contraction of the heat exchanger. This construction allows one end of the communication to move relative to the insertion hole, while the other end of the communicating pipe is secured in a mounting hole of a specific tank. With this arrangement, even when the entire heat exchanger contracts in the direction of lamination during brazing in the furnace, a mounting structure for the communicating pipe allows for the quantity of contraction and thereby ensures a smooth flow of coolant through the heat exchanger.

22 Claims, 7 Drawing Sheets

FIG. 3
FIG. 4
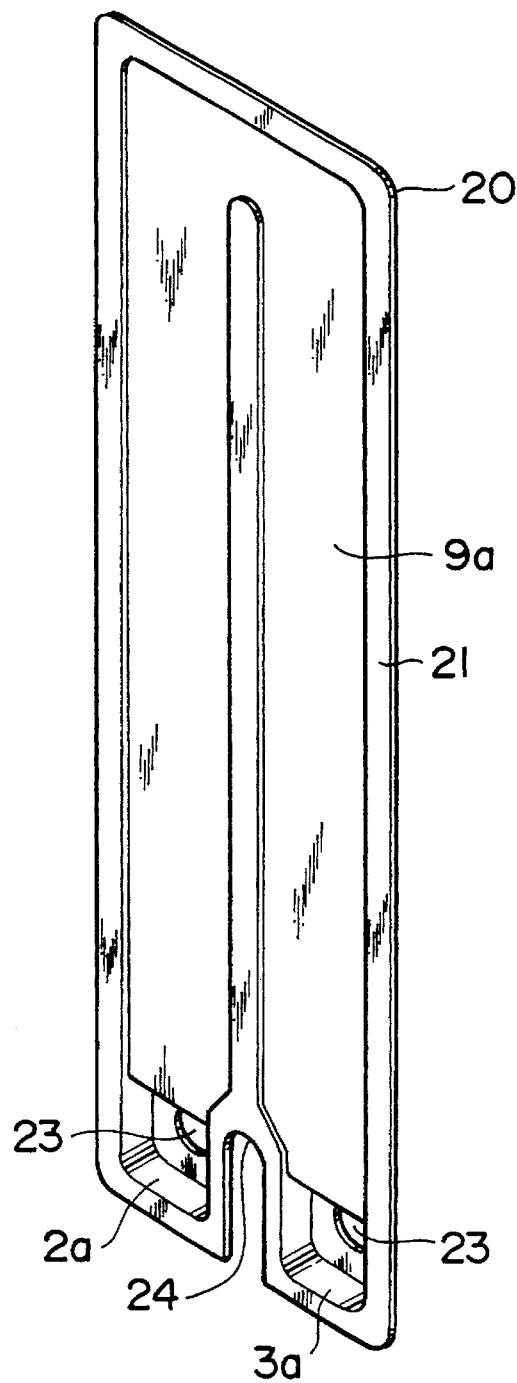
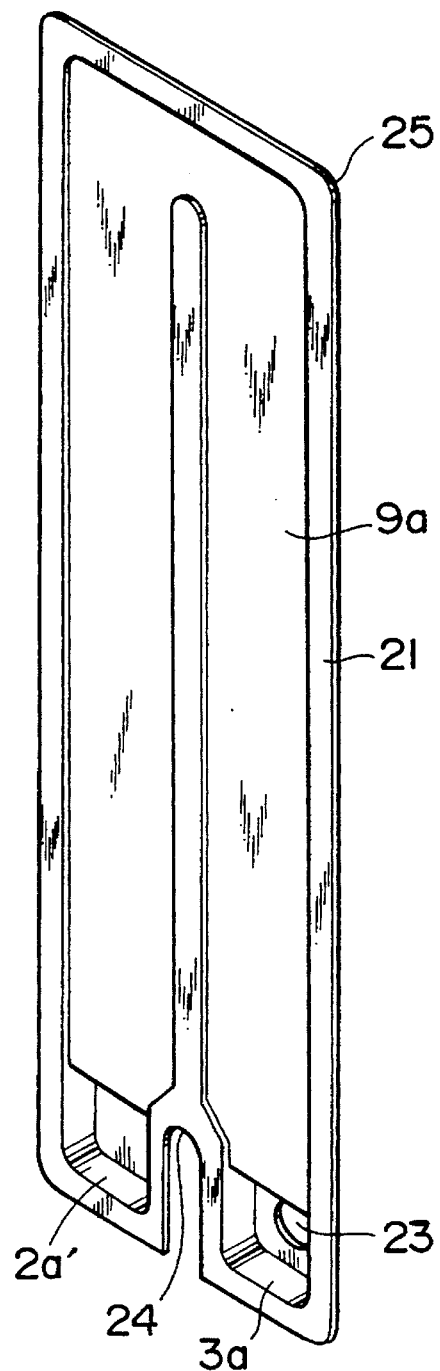

LAMINATED HEAT EXCHANGER

BACKGROUND OF THE INVENTION

1. Field of the Invention

The present invention relates to a laminated heat exchanger which can be used in a vehicle air conditioning system and in particular, a laminated heat exchanger that is provided with a pair of tanks formed on one side and with both intake and outlet portions provided parallel to each other in one of the end plates.

2. Description of the Related Art

Laminated heat exchangers of this type, that have been developed by the Applicant of the present invention, have a structure in which the core of the laminated heat exchanger is formed by laminating a plurality of levels of tube elements. A pipe passage is formed between one group of tanks and another group of tanks in a tube element group. A communicating pipe is provided in the pipe passage with one end of the communicating pipe connected to a tank in the tank group and the other end of the communicating pipe connected to a coolant passage which is formed outside of the end plate.

One end of the communicating pipe is inserted in the opening of the tank and the other end is inserted in the opening of the end plate in advance before assembling the communicating pipe in the core of the laminated heat exchanger and before brazing in the furnace, in order to prevent any misalignment between the connecting pipe and the opening of the tank or a misalignment between the communicating pipe and the opening of the end plate. The communicating pipe is then mounted in the laminated heat exchanger by securing the entire laminated heat exchanger with jigs or the like and then brazing it in the furnace.

However, in the structure described above, when brazing the laminated heat exchanger in the furnace, the length of the laminated heat exchanger in the direction of lamination is reduced by approximately 3 mm–6 mm, as the solder on the surface of the tube elements melts. This may cause one end of the communicating pipe to extend too far into the distribution tank and, at the same time, cause the other end to extend too far into the coolant passage formed outside of the end plate.

We can assume that this will greatly reduce the opening area of the communicating pipe and consequently increase resistance to flow of the coolant into the communicating pipe from an intake/outlet pipe via the coolant passage or flow of the coolant into any tank from the communicating pipe.

SUMMARY OF THE INVENTION

The object of the present invention is to provide a laminated heat exchanger in which coolant can flow smoothly by reducing coolant resistance when, for example, coolant flows into a communicating pipe from the coolant passage or when coolant flows into any tank from the communicating pipe, by addressing the problem described above.

Accordingly, the laminated heat exchanger according to the present invention is provided with tube elements that are provided with tanks and coolant passages laminated alternately with fins, and with an end plate at one end and a communicating pipe that communicates between one of the tanks and the intake and outlet portions that are formed in the end plate, via an intake/outlet coolant passage that is formed at the end plate. A means for securing joints is employed to join the communicating pipe to the tank to make the connection at one end of the communicating pipe and the other end of the communicating pipe is inserted and brazed to a cylindrical portion that is extended from the fitting hole of the end plate where the insertion is made in such a manner that while the other end of the communicating pipe is inserted, displacement is allowed.

Since one end of the communicating pipe is inserted into the cylindrical portion which extends from the fitting hole and, at the same time, the end of the communicating pipe on the tank side is secured by the means for connecting a pipe when mounting the communicating pipe, the communicating pipe remains within the cylindrical portion even when the laminated heat exchanger shrinks in the direction of lamination during brazing in the furnace. Thus, the communicating pipe is prevented from entering the coolant passage.

Also, the laminated heat exchanger according to the present invention is provided with tube elements, which are constituted of tanks and coolant passages laminated alternately with fins. The heat exchanger includes an end plate at one end and a communicating pipe that communicates between one of the tanks and intake and outlet portions that are formed in the end plate, via an intake/outlet coolant passage that is formed at the end plate. A structure is provided in which a means for securing joints is employed to join the communicating pipe to the tank to make a connection at one end of the communicating pipe. The other end of the communicating pipe, that is inserted into the fitting hole of the end plate, is provided with a notch or hole and is brazed in such a manner that displacement is allowed in the fitting hole.

With this structure, since one end of the communicating pipe is fitted in the pipe fitting hole and, at the same time, the other end of the communicating pipe on the tank side is secured by the means for mounting the communicating pipe, the intake or open area of the communicating pipe does not become reduced even when the communicating pipe intrudes into the coolant passage as the laminated heat exchanger shrinks in the direction of lamination during brazing, because the coolant flows through the notch or hole in the communicating pipe as well.

In addition, the means for connecting the pipe may be constituted by fitting and joining the communicating pipe to the mounting hole of the tank. Or, the means for connecting the pipe may be constituted by inserting the communicating pipe in the tank mounting hole and, at the same time, forming a notch or a hole in that area of the communicating pipe on the insertion side.

With this structure, the communicating pipe is secured by being fitted in the mounting hole of the tank or by being in contact with the inner wall of the tank while fluid communication is maintained by means of the notch or the hole.

BRIEF DESCRIPTION OF THE DRAWINGS

Many other advantages, features and objects of the present invention will be understood by those of ordinary skill in the art by referring to the attached drawings, which illustrate preferred embodiments of the present invention, in which:

FIG. 3 shows the structure of a formed plate used in a tube element of the tube elements that constitute the laminated heat exchanger shown in FIG. 1;

FIG. 4 shows the structure of a formed plate used in a tube element that is provided with a blind tank of the tube elements that constitute the laminated heat exchanger shown in FIG. 1;

DETAILED DESCRIPTION OF THE PREFERRED EMBODIMENTS

The following is an explanation of the embodiments according to the present invention in reference to the drawings.

Figure 1:
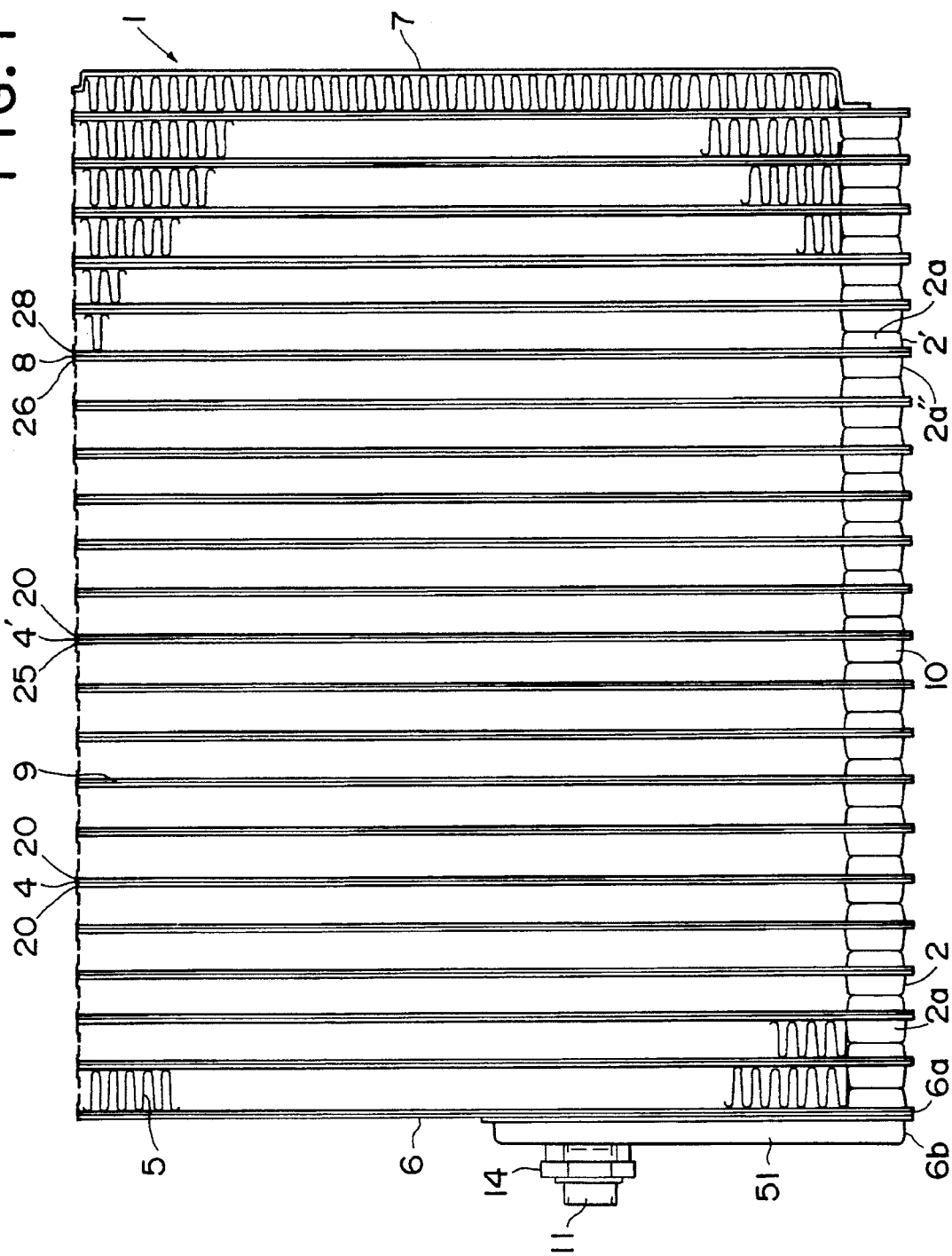
FIG. 1 is a front view of the overall structure of the laminated heat exchanger according to the present invention.
Figure 2:
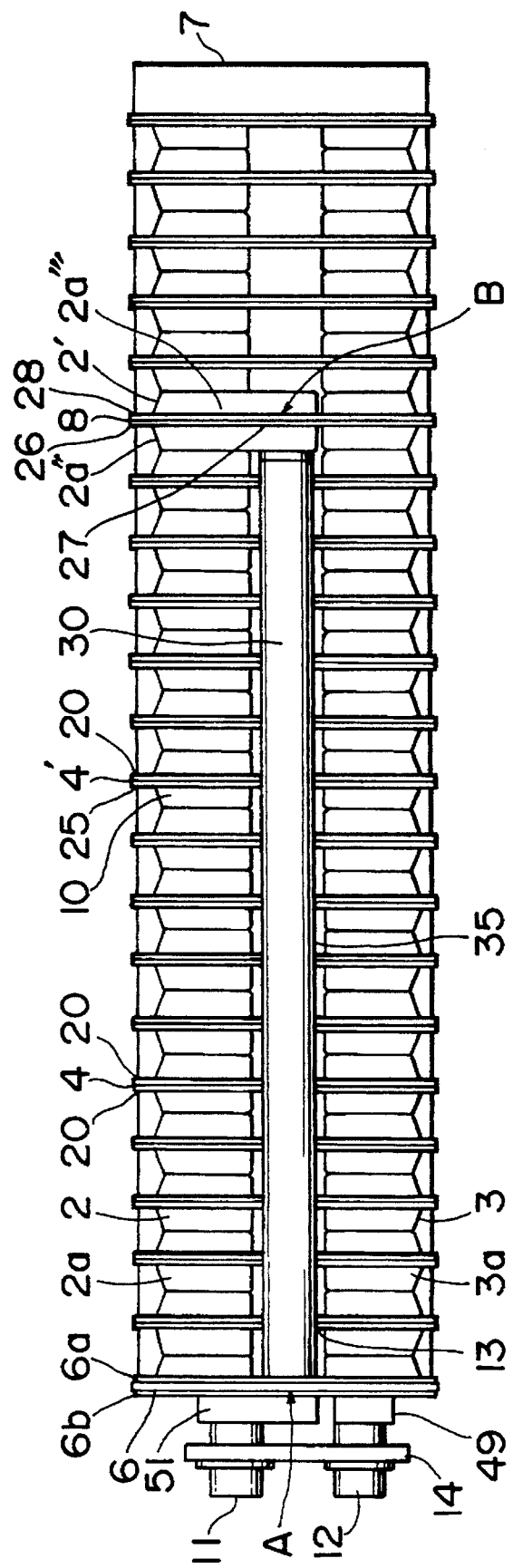
FIG. 2 is a bottom view of the overall structure of the laminated heat exchanger in FIG. 1.

In FIGS. 1–2, a laminated heat exchanger 1 is provided with tank groups 2, 3 on one side thereof and a group of U-shaped passages 9 in the remaining area thereof and is structured by laminating tube elements 4 alternately with corrugated fins 5 over a plurality of levels (20 levels, for instance), in which the core of the heat exchanger is formed by providing a tube element 4' at the approximate center between the laminated tube elements 4, and providing tube elements 8 toward the right in the figures from the tube element 4' at the approximate center, and by providing end plates 6, 7 at both ends in the direction of lamination. The intake/outlet portions 11, 12 are provided in the end plate 6 on the side opposite the tube elements and, an expansion valve (not shown) is mounted and a mounting plate 14 is provided. The details of the construction of the end plate 6 are explained later.

In the tanks of tank groups 2, 3, of the tanks which are in contact with each other, those tanks that lie adjacent to each other communicate via communicating holes 23, shown in FIGS. 3–6. The heat exchanger is structured with a 4-path coolant flow with a blind tank 10 that does not have a communicating hole and which is provided at the approximate center in the direction of lamination of the laminated heat exchanger. Since the 4-path structure is known in the art, explanation thereof is omitted.

While all the tube elements 4, 4' and 8 are formed in an approximately rectangular shape, the tube elements 4 are structured by placing brazing margins 21 of two formed plates 20, shown in FIG. 3, flush with each other.

The formed plates 20, which constitute the tube elements 4, as shown in FIG. 3, are made of aluminum and each includes a sheet applied with solder on its surface and an indented or recessed portion 9a, the upper portion of which forms the U-shaped passage group 9. At a lower end of plate 20, a pair of distended portions form tanks 2a, 3a and are formed with communicating through holes 23. A cleft portion 24 is formed between the distended portions forming tanks 2a, 3a.

By abutting pairs of formed plates 20 flush with each other, the tube elements 4 are formed. At the lower end of the tube elements 4, a pair of tank groups 2, 3 are formed. The distended portions form tank formations 2a, 3a which oppose each other and the cleft portions 24, between tank group 2 and tank group 3, form an indented portion 13.

As for the tube element 4', positioned near the center of the laminated heat exchanger 1, it is constructed by joining the formed plate 20, shown in FIG. 3, flush with the formed plate 25, shown in FIG. 4. Plate 25 is provided with a distended portion 2a' for forming a tank that has no communicating through hole 23. Joining these formed plates in this manner provides the tube element 4' with a blind tank 10.

Figure 5:
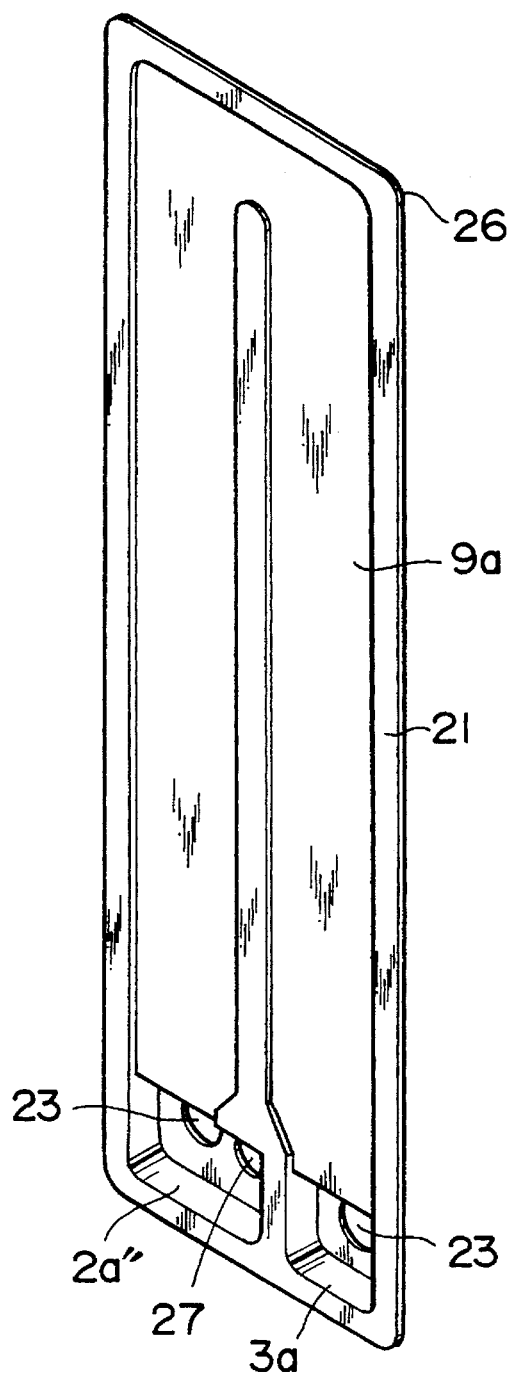
FIG. 5 shows the structure of one of the formed plates used in a tube element that is provided with a tank that links with a communicating pipe of the tube elements that constitute the laminated heat exchanger shown in FIG. 1.
Figure 6:
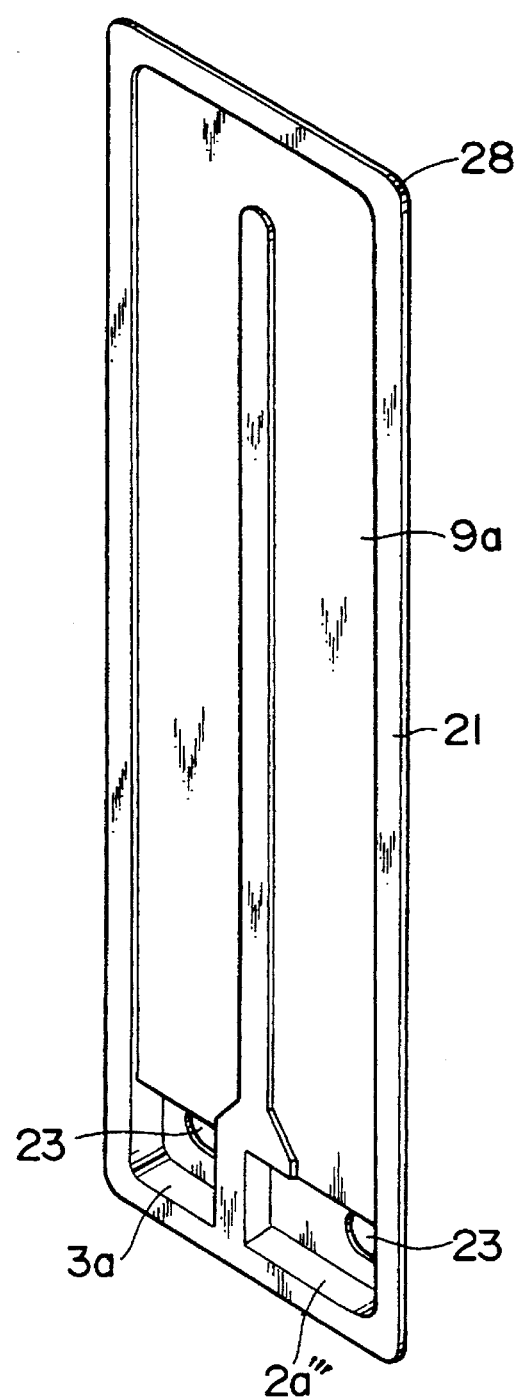
FIG. 6 shows the structure of the other formed plate used in a tube element that is provided with a tank that links with a communicating pipe of the tube elements that constitute the laminated heat exchanger shown in FIG. 1.

The tube element 8 is provided toward the right from the tube element 4' in FIG. 2, and it is constructed by joining a formed plate 26, shown in FIG. 5, flush with a formed plate 28, shown in FIG. 6.

The formed plate 26 has a basic form identical to that of the formed plate 20 except that it does not have the cleft portion 24 formed between the distended portion for tank formation 2a and the distended portion for tank formation 3a. Instead, a distended portion forming a tank 2a" is provided. The distended portion has a communicating hole 23 and a mounting hole 27 for mounting a communicating pipe 30 (to be explained later). Also, the other formed plate 28 has a basic form identical to that of the formed plate 20 except that it does not have the cleft portion 24. Instead, a distended portion forming tank 2a is provided. The distended portion extends as an approximately elliptical shape, and has a communicating hole 23.

By abutting the formed plate 26 flush with the formed plate 28, the tube element 8 is formed. On a lower end side of tube element 8, the distended portions 2a" and 3a form a tank 2' and a tank of tank group 3, respectively. Note that the mounting hole 27 of the tank 2' opens toward a passage 35, which is to be explained later.

The end plate 6 includes a flat plate 6a and a passage forming plate 6b. The flat plate 6a blocks off the formed plate 20 and is provided with a pipe fitting hole 50. A communicating pipe 30 is fitted into hole 50 and into a coolant distribution hole (not shown) which opens into the distended portion 3a of the formed plate 20. An intake/outlet hole (not shown) is formed in plate 6b and receives the intake/outlet portion 12. Also, note that the passage forming plate 6b is provided with an intake/outlet hole (not shown) which receives the intake/outlet portion 11. By joining the flat plate 6a and the passage forming plate 6b, a coolant distribution passage 49 and an intake/outlet coolant passage 51 are formed.

With the core of the heat exchanger constructed by laminating the fins 5 with tube elements 4, 4' and 8 over a plurality of levels, and with the end plates 6, 7 provided at both ends, a passage 35, which is formed by the communicating pipe 30, extends between tank group 2 and tank group 3.

Next, the details of a means A for connecting the communicating pipe 30 to the end plate 6 and a means B for securing the communicating pipe 30 to the mounting hole 27 of the tank 2' are explained with reference to FIGS. 7A, 7B and 8.

The means for connecting A is constructed by providing a cylindrical portion 53 whose internal diameter is such that the communicating pipe 30 can be inserted snugly within the internal diameter of the pipe inserting hole 50. The pipe 53 is formed in end plate 6a and extends toward the passage 35. In the means for securing B, the communicating pipe 30 is stepped, i.e., the external diameter is reduced, so that the end portion of the communicating pipe 30 on the tank 2' side can be secured by inserting it into the mounting hole of the tank 2'.

Figure 7A:
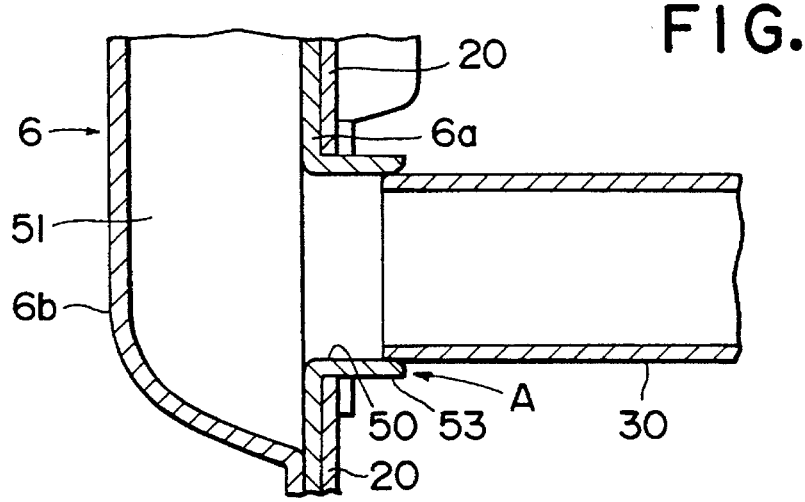
FIGS. 7A and 7B show a means for mounting a communicating pipe including a cylindrical portion that extends from a fitting hole in an end plate.

In the structure described above, when assembling the laminated heat exchanger 1, the end of the communicating pipe 30 on the end plate 6 side is only partially inserted in the opening of the cylindrical portion 53 as shown in FIG. 7A and, at the same time, the end of the communicating pipe 30 on the tank 2' side is secured in the mounting hole 27 of the tank 2'.

With the above arrangement, even when the laminated heat exchanger 1 contracts in the direction of lamination during brazing in the furnace, the end of the communicating pipe 30 on the tank 2' side does not move further into the tank 2'. At the same time, although the end of the communicating pipe 30 at the end plate 6 side moves toward an intake/outlet coolant passage 51, the pipe 30 does not project into the intake/outlet coolant passage 51 any further than the base portion of the cylindrical portion 53, as shown in FIG. 7B. As a result, coolant flowing from the intake/outlet portion 11 to the tank 2' via the intake/outlet coolant passage 51 and the communicating pipe 30 can flow smoothly without being hindered by a side surface of the communicating pipe 30, thereby avoiding an increase in the resistance to coolant flow.

Figure 7B:
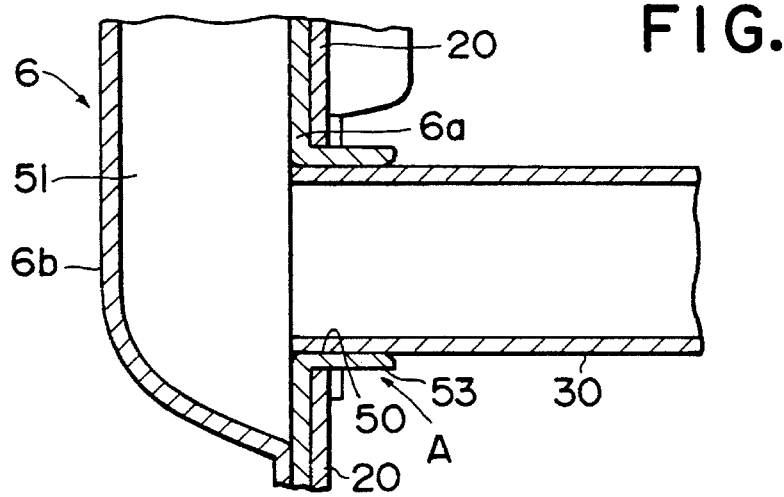
Figure 9:
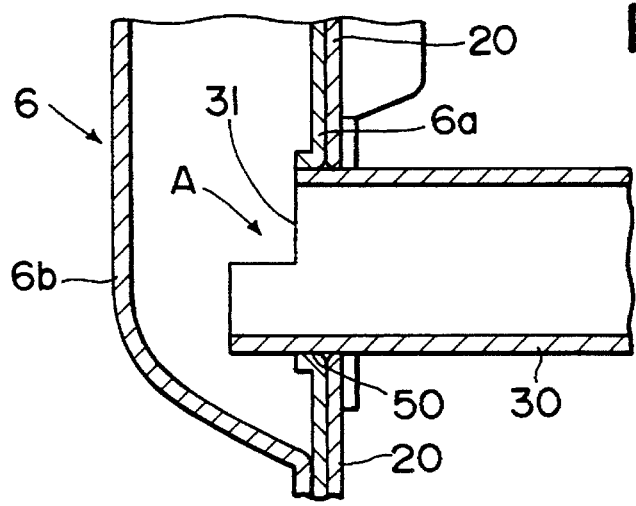
FIGS. 9–11 show other embodiments of the means for connecting a communicating pipe.
Figure 10:
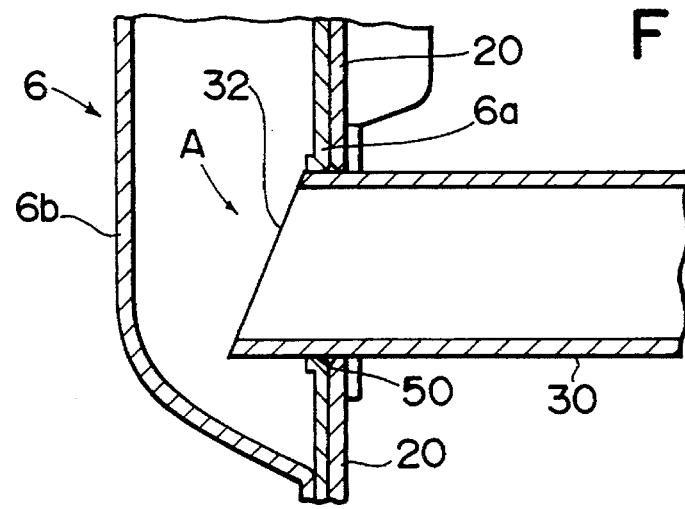

Note that the form of the means for connecting is not limited to the structure shown in FIGS. 7A and 7B. As shown in FIG. 9, for example, instead of the cylindrical portion 53 extending toward the passage 35 from the pipe fitting hole 50 formed in the end plate 6a, a straight notch 31 may be formed at the end of the communicating pipe 30, or, instead of the straight notch 31, a diagonal notch 32 may be formed at the communicating pipe 30, as shown in FIG. 10. Furthermore, instead of the notch 31 or 32, a hole may be provided on the side surface of the communicating pipe 30.

With the structure described above, when assembling the laminated heat exchanger 1, with the un-notched area at the end of the communicating pipe 30 placed in contact with the fitting hole 50 so that the notch 31 or 32 faces the intake/outlet portion 11, coolant flows through the opening formed by the notch 31 or 32 even when the laminated heat exchanger 1 contracts in the direction of lamination and the communicating pipe 30 projects into the intake/outlet coolant passage 51. Consequently, resistance to the flow of coolant can be reduced.

Figure 11:
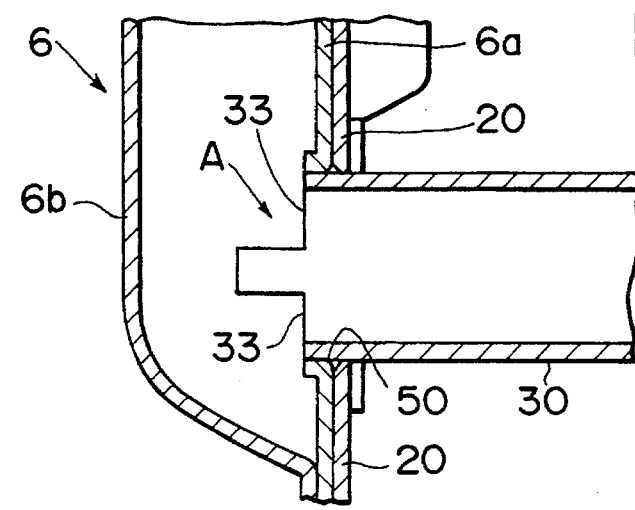

In addition, as shown in FIG. 11, the means for connecting A may be provided with two notches 33 formed in the communicating pipe 30 and facing opposite each other. With this structure, the communicating pipe 30 can be inserted into the fitting hole 50 without worrying about the position of the notches 33.

Figure 8:
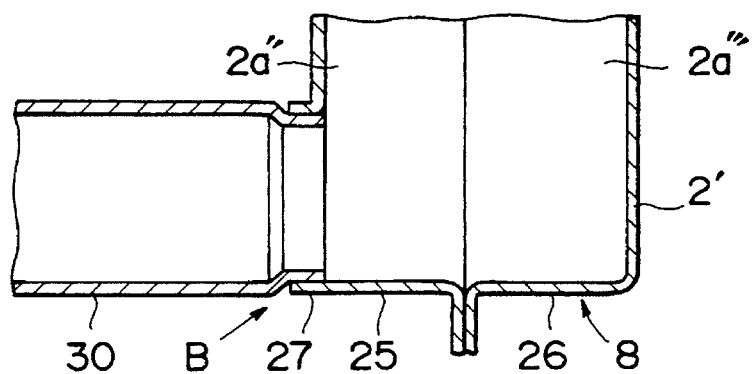
FIG. 8 shows a means for mounting a communicating pipe in a mounting hole formed in the tank and the communicating pipe that is provided with a front end portion that can be fitted in the mounting hole.

At the same time, the structure of the means for securing B is also not limited to the one shown in FIG. 8. Instead, it may assume the structure shown in FIG. 12, in which the internal diameter of the communicating pipe 30 at the end on the tank 2' side, is such that the end can be externally fitted onto the external diameter of the mounting hole 27. This structure also ensures that the communicating pipe 30 is secured to the mounting hole 27.

Figure 13:
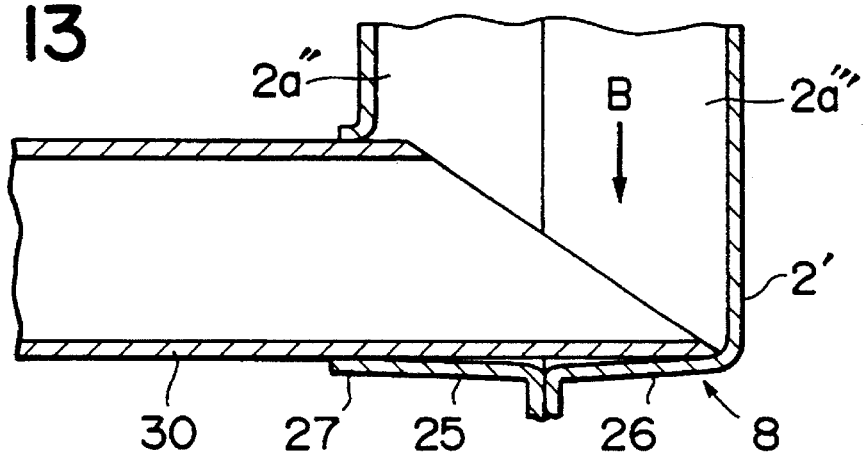

Furthermore, the structure of the means for securing B is not limited to the structure in which the communicating pipe 30 is fitted in the mounting hole 27 of the tank 2'. As shown in FIG. 13, when assembling the laminated heat exchanger 1, the length of the communicating pipe 30 may be set so that the communicating pipe 30 contacts the inner wall of the tank group 2'. A diagonal notch 34 is formed at the front end of the communicating pipe 30. In this case, it is necessary to turn the notch 34 toward the upper end of the tube element 8 when mounting the communicating pipe 30.

With this structure, since the communicating pipe 30 is in contact with the inner wall of the tank 2' even when the laminated heat exchanger 1 contracts in the direction of the lamination during brazing in the furnace, the end of the communicating pipe 30 on the tank 2' side cannot move. As a result, coolant flows even more smoothly through the opening formed by the diagonal notch 34 and an increase in coolant resistance is avoided.

Figure 14:
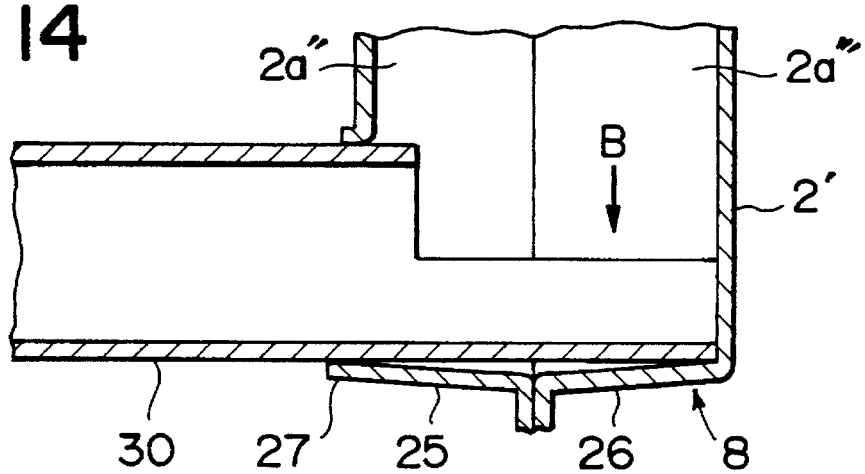

Also, the means for securing B may take the structure shown in FIG. 14, in which the length of the communicating pipe 30 may be set so that the communicating pipe 30 contacts the inner wall of the tank group 2' when assembling the laminated heat exchanger 1. A rectilinear notch 34 is formed at the front end of the communicating pipe 30. With this structure, since the surface over which the communicating pipe 30 is in contact with the inner wall of the tank 2' is increased, the communicating pipe 30 is secured more reliably.

Lastly, the combination of various forms of the means for connection A, shown in FIG. 7A, 7B and 9–11, and the various forms of the means for securing B, shown in FIG. 8 and 12–14, are not limited to any specific combination.

As has been explained, with the heat exchanger shown in FIG. 7A, 7B, the end of the communicating pipe 30 stays at the cylindrical portion and does not intrude into the coolant passage even when the laminated heat exchanger contracts in the direction of lamination during brazing in the furnace. The end of the communicating pipe at the fitting hole side is fitted into the cylindrical portion that extends from the fitting hole. The other end of the communicating pipe on the tank side is secured by the means for securing the pipe when mounting the communicating pipe. As a result, the opening area of the communicating pipe is not reduced and an increase in coolant flow resistance is avoided.

Also, with the heat exchanger that is structured as shown in FIGS. 9–11, the coolant is distributed through the notch or the hole in the communicating pipe even when the communicating pipe enters into the coolant passage upon the contraction of the laminated heat exchanger in the direction of lamination during brazing in the furnace. The end of the communicating pipe on the fitting hole side is fitted in the fitting hole and the end of the communicating pipe on the tank side is secured by the means for securing the pipe. As a result, the opening area of the communicating pipe is not reduced! and an increase in coolant flow resistance is avoided.

Figure 12:
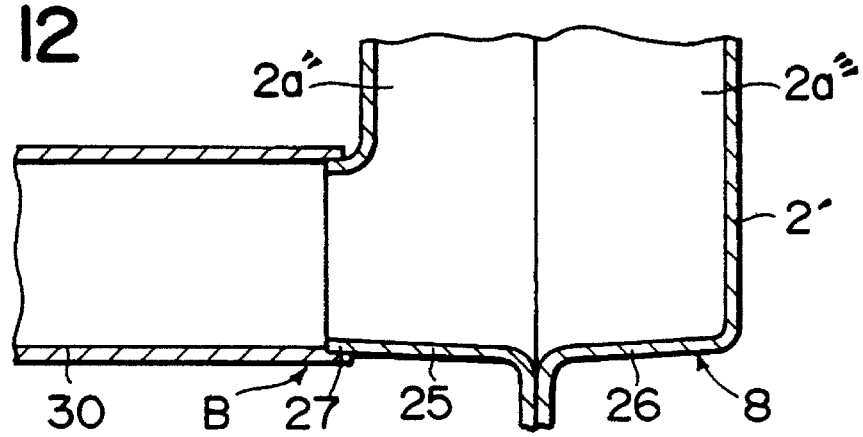
FIGS. 12–14 show other embodiments of the means for mounting a communicating pipe in a mounting hole formed in a tank.

Furthermore, if a fitting structure such as that shown in FIG. 8 or 12 is provided, the communicating pipe is secured by being fitted into the mounting hole of the tank, thereby simplifying the securing method. Also, if a structure such as that shown in FIG. 13 or 14 is provided, the end of the communicating pipe on the tank side is secured in contact with the inner wall of the tank and, at the same time, the smooth flow of coolant is ensured. As a result, the opening area of the communicating pipe is not reduced and an increase in coolant flow resistance is avoided.

What is claimed is:

1. A laminated heat exchanger made by the process comprising the steps of:

forming an assembly of tanks including a plurality of hydraulically connected tube elements, each tube element having a pair of tanks and a U-shaped passage providing communication between said tanks, said tank assembly having a first end and a second end;

laminating a plurality of corrugated fins with said tube elements;

positioning a first end-plate structure at said first end of said tank assembly, said first end plate structure including an exterior wall and an interior wall, said first end-plate structure defining at least two interior coolant inlet/outlet passageways, and each said passageway extending between an opening through said exterior wall and an opening through said interior wall;

positioning a second end-plate structure at said second end of said tank assembly;

extending a pipe between said first end-plate structure and a selected one of said tube elements intermediate said first and second end-plate structures, wherein said pipe includes a first end and a second end, said first pipe end is displaceably coupled to one of said first end-plate passageways at one of said openings through said interior wall, and said second pipe end is fixed to and fluidly coupled with a flow opening of said selected tube element; and brazing said assembly, said fins, said first and second end plate structures and said pipe together.

2. The laminated heat exchanger as claimed in claim 1, wherein said tank elements define a pair of tank groups and one of said tank groups is divided into first and second sections by partitioning said tank group along the length of said tank assembly, said first section being located near said first end-plate structure and being directly connected to one of said inlet/outlet coolant passages, and said second section being connected to another of said inlet/outlet coolant passages through said pipe.

3. The laminated heat exchanger as claimed in claim 1, wherein said tube elements, between said first end-plate structure and said selected tube element, have an opening between said tanks of each of said tank elements, wherein said pipe extends through said openings.

4. The laminated heat exchanger as claimed in claim 1, wherein said first end of said pipe includes a formation which is an incomplete cylindrical section, said section extending through one of said interior wall openings and partially into one of said coolant inlet/outlet passageways.

5. The laminated heat exchanger as claimed in claim 1, wherein said first end of said pipe extends through one of said interior wall openings into one of said coolant inlet/outlet passageways, said first pipe end being angled so that an opening at said first pipe end is elliptical in shape.

6. The laminated heat exchanger as claimed in claim 1, further comprising a mounting portion extending from said flow opening of said selected tube element.

7. The laminated heat exchanger as claimed in claim 6, wherein:

said second end of said pipe includes a reduced diameter portion which is connected to the remaining portion of said pipe by a stepped portion, wherein said mounting portion receives said reduced diameter portion and abuts said stepped portion.

8. The laminated heat exchanger as claimed in claim 1, wherein said second end of said pipe extends through said flow opening of said selected tube element and abuts an inner wall of said tube element.

9. The laminated heat exchanger as claimed in claim 1, wherein said second end of said pipe is angled so that an opening at said second end of said pipe forms an ellipse and said second end of said pipe extends through said flow opening of said selected tube element and abuts an inner wall of said tube element.

10. The laminated heat exchanger as claimed in claim 1, wherein said second end of said pipe includes an incomplete cylindrical formation which extends through said flow opening of said selected tube element and abuts an inner wall of said tube element.

11. The laminated heat exchanger as claimed in claim 1, wherein a semi-circular wall portion extends from the second end of said pipe through said flow opening in said selected tube element and abuts an inner wall of said tube element.

12. A laminated heat exchanger comprising:

an assembly of tanks including a plurality of hydraulically connected tube elements, each tube element having a pair of tanks and a U-shaped passage providing communication between said tanks, said tank assembly having a first end and a second end;

a plurality of corrugated fins laminated with said tube elements;

a first end-plate structure positioned at said first end of said tank assembly and including an exterior wall and an interior wall, said first end-plate structure defining at least two interior coolant inlet and outlet passageways, each said passageway extending between an opening formed in said exterior wall and an opening through said interior wall, and said first end-plate structure comprising a cylindrical portion extending from the periphery of one of said openings through said interior wall of said first end-plate structure toward a selected one of said tube elements intermediate said first and second end-plate structures;

a second end-plate structure positioned at said second end of said tank assembly;

a pipe extending between said first end-plate structure and said selected tube element intermediate said first and second end-plate structures, wherein said pipe includes a first pipe end and a second pipe end and said first pipe end is coupled to said cylindrical portion and said second pipe end is fixed to and fluidly coupled with a flow opening of said selected tube element.

13. The laminated heat exchanger as claimed in claim 12, wherein said tank elements define a pair of tank groups and one of said tank groups is divided into first and second sections by partitioning said tank group along the length of said tank assembly, said first section being located near said first end-plate structure and being directly connected to one of said inlet and outlet passageways, and said second section being connected to another of said inlet/outlet passageways through said pipe.

14. The laminated heat exchanger as claimed in claim 12, wherein said tube elements, between said first end-plate structure and said selected tube element, have an opening between said tanks of each of said tank elements, wherein said pipe extends through said openings.

15. The laminated heat exchanger as claimed in claim 12, further comprising a mounting portion extending toward said second end of said pipe from said flow opening of said selected tube element.

16. The laminated heat exchanger as claimed in claim 15, wherein said mounting portion is inserted into said second end of said pipe.

17. The laminated heat exchanger as claimed in claim 15, wherein:

said second end of said pipe includes a reduced diameter portion which is connected to the remaining portion of said pipe by a stepped portion, wherein said mounting portion receives said reduced diameter portion and abuts said stepped portion.

18. The laminated heat exchanger as claimed in claim 12, wherein said second end of said pipe is angled so that an opening at said second end of said pipe forms an ellipse and said second end of said pipe extends through said flow opening of said selected tube element and abuts an inner wall of said tube element.

19. The laminated heat exchanger as claimed in claim 12, wherein said second end of said pipe includes an incomplete cylindrical formation which extends through said flow opening of said selected tube element and abuts an inner wall of said tube element.

20. The laminated heat exchanger as claimed in claim 12, wherein said second end of said pipe includes a semi-cylindrical portion which extends through said flow opening of said selected tube element and abuts an inner wall of said tube element.

21. An air conditioning system for a vehicle including, a laminated heat exchanger comprising:

an assembly of tanks including a plurality of hydraulically connected tube elements, each of said tube elements having a pair of tanks and a U-shaped passage providing communication between said tanks, said tank assembly having a first end and a second end;

a plurality of corrugated fins laminated with said tube elements;

a first end-plate structure positioned at said first end of said tank assembly and including an exterior wall and an interior wall, said first end plate structure defining at least two interior coolant inlet/outlet passageways, each said passageway extending between an opening through said exterior wall and an opening through said interior wall;

a second end-plate structure positioned at said second end of said tank assembly; and a pipe extending between said first end-plate structure and a selected one of said plurality of tube elements intermediate said first and second end-plate structures, wherein said first pipe end is coupled to one of said first end-plate passageways at one of said openings through said interior wall and said second pipe end is coupled to an inlet passage of said selected tube element.

22. The air conditioning system as claimed in claim 21, wherein said first end-plate structure further includes a cylindrical portion extending from the periphery of one of said openings through said interior wall of said first end-plate structure toward said selected one of said tube elements intermediate said first and second end-plate structures.

* * * * *